United States Patent
Hsu et al.

(10) Patent No.: US 9,582,029 B2
(45) Date of Patent: Feb. 28, 2017

(54) METHOD OF FABRICATING HOUSING AND HOUSING

(71) Applicant: HTC Corporation, Taoyuan County (TW)

(72) Inventors: Hsi-Hsing Hsu, Taoyuan Hsien (TW); Che-Kai Lin, Taoyuan Hsien (TW); Shan-Chin Chang, Taoyuan Hsien (TW); Chih-Wei Chen, Taoyuan Hsien (TW); Hung-Chi Shui, Taoyuan Hsien (TW)

(73) Assignee: HTC Corporation, Taoyuan (TW)

( * ) Notice: Subject to any disclaimer, the term of this patent is extended or adjusted under 35 U.S.C. 154(b) by 260 days.

(21) Appl. No.: 14/322,923

(22) Filed: Jul. 3, 2014

(65) Prior Publication Data

US 2016/0007493 A1    Jan. 7, 2016

(51) Int. Cl.
| | | |
|---|---|---|
| *G06F 1/16* | (2006.01) | |
| *B29C 45/14* | (2006.01) | |
| *B29L 31/34* | (2006.01) | |

(52) U.S. Cl.
CPC .......... *G06F 1/16* (2013.01); *B29C 45/14467* (2013.01); *B29L 2031/3406* (2013.01); *B29L 2031/3481* (2013.01)

(58) Field of Classification Search
CPC .... H04M 1/22; H04M 1/0252; H04M 1/0266; H04M 1/0226; G06F 1/1656; G06F 1/1626; G06F 1/1637; B29C 45/14467; B29C 45/14475; B29C 45/14311; B29C 45/14811; B29C 45/14344; H05K 5/0004; H05K 5/0013; H05K 5/0243; H05K 5/062; H05K 5/03

See application file for complete search history.

(56) References Cited

U.S. PATENT DOCUMENTS 6,507,377 B1 *  1/2003  Jung ................. G02F 1/133308
                                                      349/58
6,788,894 B2 *  9/2004  Suzuki .................. G03B 17/48
                                                      348/333.01

(Continued)

FOREIGN PATENT DOCUMENTS

CN    101340787 A    1/2009
JP    63-126711 A    5/1988

(Continued)

OTHER PUBLICATIONS

Corresponding Taiwanese Office Action that these art references were cited on Jun. 2, 2016.

*Primary Examiner* — Daniel Wiley
(74) *Attorney, Agent, or Firm* — CKC & Partners Co., Ltd.

(57) ABSTRACT

A method of fabricating a housing includes: providing a metal member including a base plate and a sidewall, the base plate having an inner surface connected to the sidewall; providing a filler having a connecting surface and a first top surface; fixing the filler onto the metal member to make the connecting surface connect to the inner surface and the first top surface to respectively form first and second included angles larger than 90 degrees and smaller than 180 degrees; providing a film attached with an ink layer, and then performing a process of In-Mold-Roller Injection Molding to form a plastic on the sidewall and the filler, the ink layer attached to the plastic; and removing a part of the filler and a part of the plastic at the sidewall to form a machined surface connected to the inner surface and the upper appearance surface.

10 Claims, 7 Drawing Sheets

(56) References Cited

U.S. PATENT DOCUMENTS

| | | | | |
|---|---|---|---|---|
| 7,697,269 | B2* | 4/2010 | Yang | B29C 65/58 |
| | | | | 361/679.01 |
| 8,779,993 | B2* | 7/2014 | Chiang | B32B 37/10 |
| | | | | 156/243 |
| 2009/0115312 | A1 | 5/2009 | Hu | |
| 2010/0143648 | A1* | 6/2010 | Tsai | B29C 45/14311 |
| | | | | 428/138 |
| 2012/0168339 | A1* | 7/2012 | Jan | B29C 45/0055 |
| | | | | 206/524.1 |
| 2013/0161322 | A1* | 6/2013 | Li | B41M 1/30 |
| | | | | 220/62.14 |
| 2013/0313017 | A1* | 11/2013 | Zhu | H05K 5/02 |
| | | | | 174/520 |

FOREIGN PATENT DOCUMENTS

| | | |
|---|---|---|
| TW | I312724 B | 8/2009 |
| TW | M376415 U | 3/2010 |
| TW | 201121758 A | 7/2011 |

\* cited by examiner

S100 — Providing a metal member 10, in which the metal member 10 includes a base plate 100 and a sidewall 102, the base plate 100 has an inner surface 100a, the sidewall 102 is connected to the inner surface 100a and disposed at an edge of the inner surface 100a

S102 — Providing a filler 12, in which the filler 12 has a connecting surface 120a and a first top surface 120b

S104 — Fixing the filler 12 onto the metal member 10, so as to make the connecting surface 120a connect to the inner surface 100a to form a first included angle θ1, and make the connecting surface 120a connect to the first top surface 120b to form a second included angle θ2, in which the first included angle θ1 and the second included angle θ2 are larger than 90 degrees and smaller than 180 degrees

S106 — Providing a film 3 on which an ink layer 16 is attached, and then performing a process of In-Mold-Roller Injection Molding, so as to form a plastic 14 on the sidewall 102 and the filler 12 and make the plastic 14 form a side inclined surface 140a and an upper appearance surface 140b, and the film 3 and the plastic 14 are pressed to make the ink layer 16 attach to the upper appearance surface 140b of the plastic 14, so as to form a surface of a part of the plastic 14 to become the upper appearance surface 140b having the ink layer 16

S108 — Machining the metal member 10, the filler 12, and the plastic 14 after performed by the process of In-Mold-Roller Injection Molding, removing at least a part of the filler 12 and at least a part of the plastic 14 to form a machined surface 200, in which the machined surface 200 is connected to the inner surface 100a to form a first machined angle θ3, the junction where the machined surface 200 is connected to the upper appearance surface 140b forms a second machined angle θ4, and the first machined angle θ3 and the second machined angle θ4 are larger than or equal to 90 degrees

Fig. 1

METHOD OF FABRICATING HOUSING AND HOUSING

BACKGROUND

Technical Field

The present disclosure relates to a method of fabricating a housing and a housing.

Description of Related Art

With features of lightweight, easy-made, and low cost, plastics has been widely used in manufacturing processes of injection molding or thermoforming. In the manufacturing processes, molten plastic are first injected into a mold, and then a housing formed with a desired shape under the pressure and temperature change.

In the past, spraying operations were usually used to make the surface of plastics render special patterns or colors. However, the spraying operations need more time, in addition to machines and factories, to dry paints, and the spraying operations must be performed after the plastics is formed by injection machines, which spend even more time and labor costs. Therefore, a process of In-Mold-Roller (IMR), which refers to attaching printing ink to the surface of the plastics by thermal transferring, is developed for products of mass production. Referring to FIG. 5A to FIG. 5D, the figures are schematic diagrams of the conventional process of In-Mold-Roller. The mold used in the process of In-Mold-Roller Injection Molding mainly includes a female die 50, a male die 52, and a stripper 54. The process of In-Mold-Roller Injection Molding is performed to position a continuous film 4 to an injection mold cavity by a feeder and a retainer plate (as shown in FIG. 5A), to adsorb the film 4 onto a die surface of the female die 50 by a vacuum device (as shown in FIG. 5B), and to inject after the female die 50 and the male die 52 are clamped to each other (as shown in FIG. 5C). At this time, the plastic will be injected into the cavity between the male die 52 and the female die 50 via the stripper 54, the plastic in the cavity is finally molded to become a plastic product 6, and ink 7 will be transferred onto the surface of the plastic product 6. When the female die 50 and the male die 52 are opened, the ink 7 and the film 4 are separated from each other to complete the decoration of the surface of the plastic product 6 (as shown in FIG. 5D), and the waste materials 8 can be removed after the male die 52 and the stripper 54 are separated from each other.

However, a shortcoming of the current process of In-Mold-Roller Injection Molding is that the film is influenced by product shape, mold design, and conditions and parameters of injection molding during injection molding, so that the film is easily broken and folded to cause an adverse appearance. As such, the process of In-Mold-Roller Injection Molding is normally applied to products with flat appearance surfaces or appearance surfaces with smaller curvatures. Accordingly, how to perform the process of In-Mold-Roller Injection Molding to products having uneven appearance surfaces or having appearance surfaces with larger curvatures becomes an important issue to be solved by those in the industry.

SUMMARY

The disclosure provides a method of fabricating a housing, which includes: (a) providing a metal member, in which the metal member includes a base plate and at least one sidewall, the base plate has an inner surface, the sidewall is connected to the inner surface and disposed at an edge of the inner surface; (b) providing a filler, in which the filler has a connecting surface and a first top surface; (c) fixing the filler onto the metal member, so as to make the connecting surface connect to the inner surface to form a first included angle, and make the connecting surface connect to the first top surface to form a second included angle, in which the first included angle and the second included angle are larger than 90 degrees and smaller than 180 degrees; (d) providing a film on which an ink layer is attached, and then performing a process of In-Mold-Roller Injection Molding, so as to form a plastic on the sidewall and the filler, and the film and the plastic are pressed to make the ink layer attach to the plastic, so as to form a surface of a part of the plastic to become an upper appearance surface having the ink layer; and (e) machining a housing having the ink layer, removing at least a part of the filler and at least a part of the plastic to form a machined surface, in which the machined surface is connected to the inner surface to form a first machined angle, the machined surface is connected to the upper appearance surface to form a second machined angle, and the first machined angle and the second machined angle are larger than or equal to 90 degrees.

The disclosure further provides a housing applicable for an electronic device. The housing includes a frame and a decorative layer. The frame includes a bottom surface, a machined surface, and an upper appearance surface. The machined surface is connected to the bottom surface to form a first machined angle at the junction of the machined surface and the bottom surface. The upper appearance surface is connected to the machined surface to form a second machined angle at the junction of the upper appearance surface and the machined surface. The frame further includes a metal member, a filler, and a plastic. The metal member includes a base plate and at least a sidewall. The base plate has an inner surface. The sidewall is connected to the inner surface and disposed at an edge of the inner surface. The filler is fixed onto the metal member. The plastic is formed on the metal member. The decorative layer is disposed on the upper appearance surface.

Accordingly, the method of fabricating a housing of the present disclosure is firstly fixing the filler onto the metal member, so as to make the appearance surface which is uneven or has a larger curvature on the metal member disappear because the filler closes up to the metal member, and a flat appearance surface is formed at the junction of the assembled filler and the metal member. Therefore, when the process of In-Mold-Roller Injection Molding is performed to the metal member and the filler, the film used for transferring can be successfully attached onto the assembled metal member and the filler without being folded or broken. After injecting, the metal member and the filler will be combined with the injected plastic and attached with the transferred ink layer. Finally, by further machining to remove at least a part of the filler and a part of the plastic, the housing having the appearance surface which is uneven or has a larger curvature manufactured by applying the process of In-Mold-Roller Injection Molding can be implemented.

BRIEF DESCRIPTION OF THE DRAWINGS

The disclosure can be more fully understood by reading the following detailed description of the embodiment, with reference made to the accompanying drawings as follows:

FIG. 1 is a flow diagram of a method of fabricating a housing according to an embodiment of the disclosure;

DETAILED DESCRIPTION

Figure 2A:
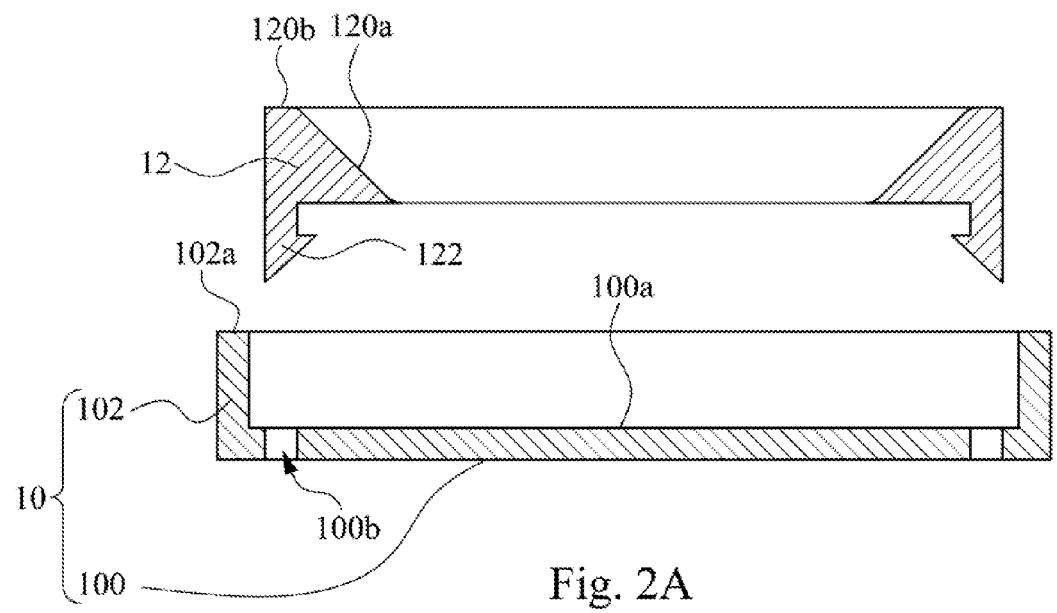
FIG. 2A is a cross-sectional view of a metal member and a filler according to an embodiment of the disclosure, in which the filler is not fixed onto the metal member yet.
Figure 2B:
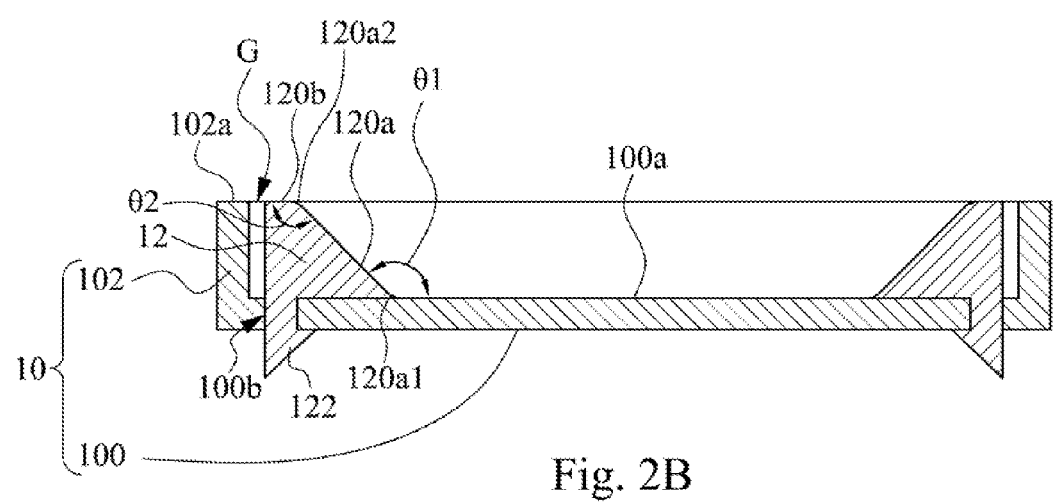
FIG. 2B is a cross-sectional view of the next step of FIG. 2A, in which the filler has been fixed onto the metal member.
Figure 2C:
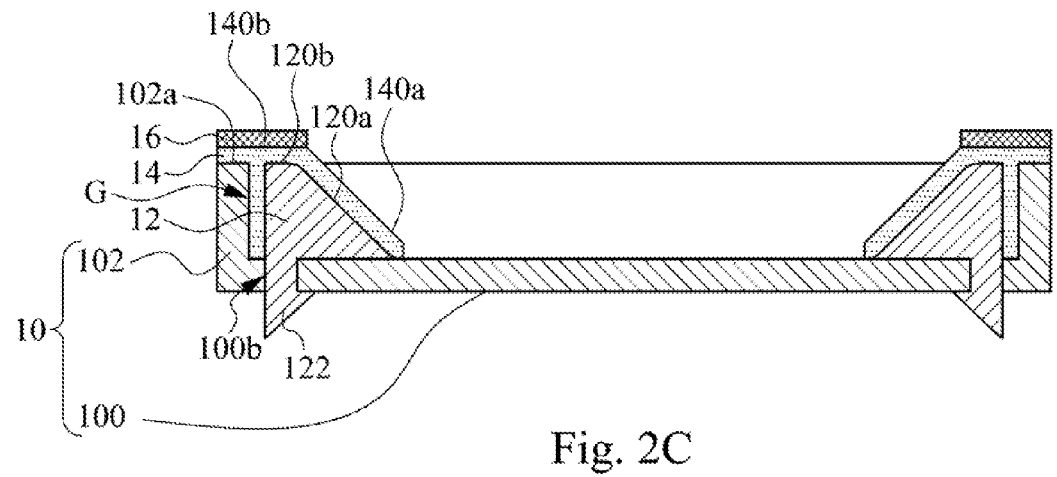
FIG. 2C is a cross-sectional view of the next step of FIG. 2B, in which a plastic and an ink layer are formed on the metal member and the filler.
Figure 2D:
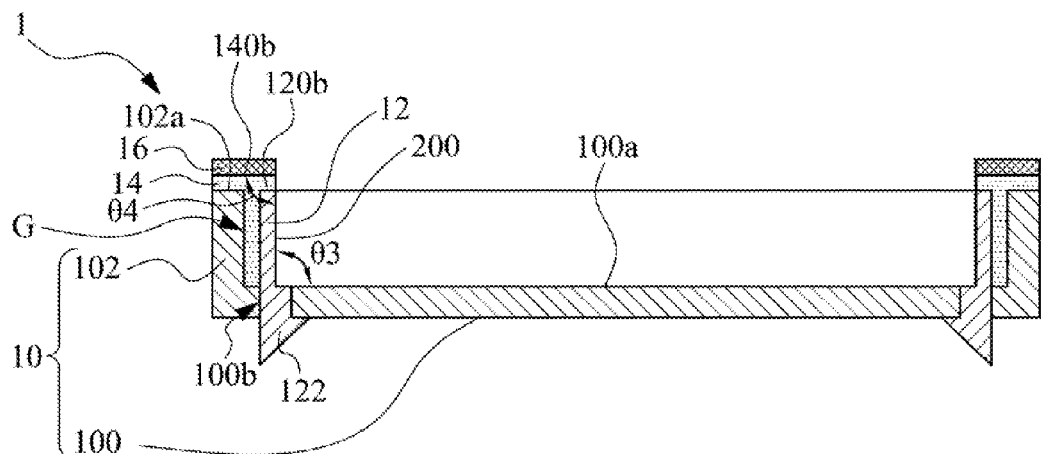
FIG. 2D is a cross-sectional view of the next step of FIG. 2C, in which a part of the filler and a part of the plastic have been removed.
Figure 3A:
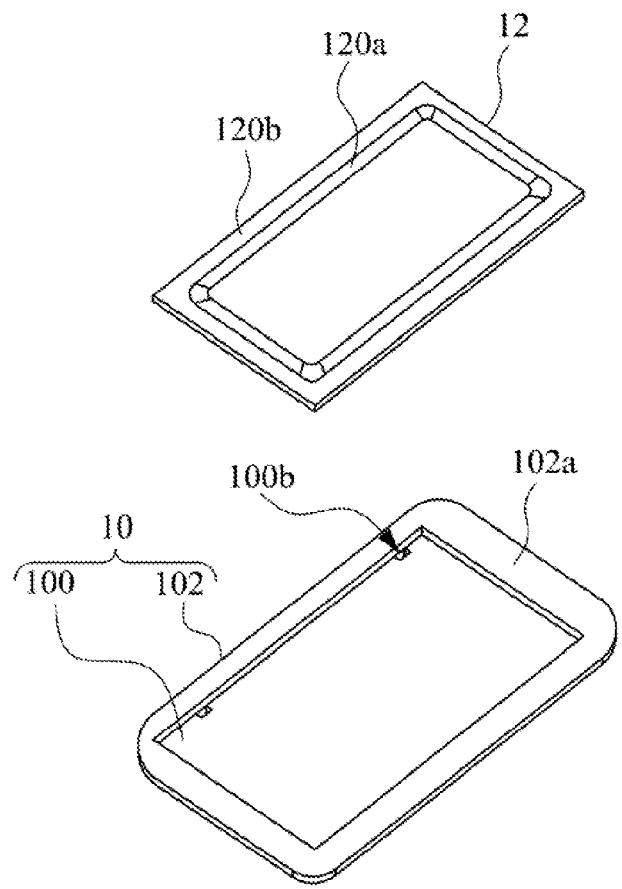
FIG. 3A is a perspective view corresponding to FIG. 2A.
Figure 3B:
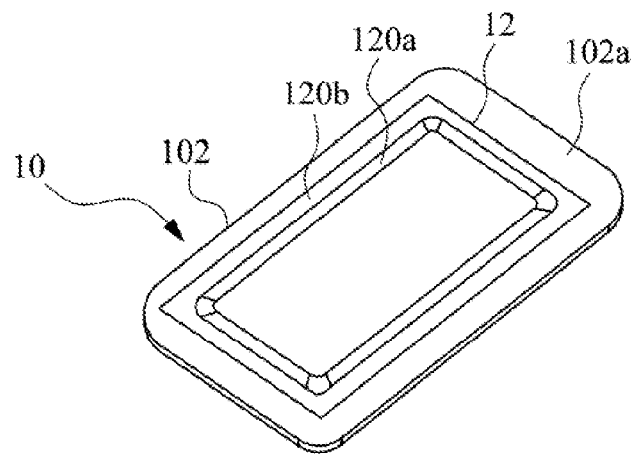
FIG. 3B is a perspective view corresponding to FIG. 2B.
Figure 4A:
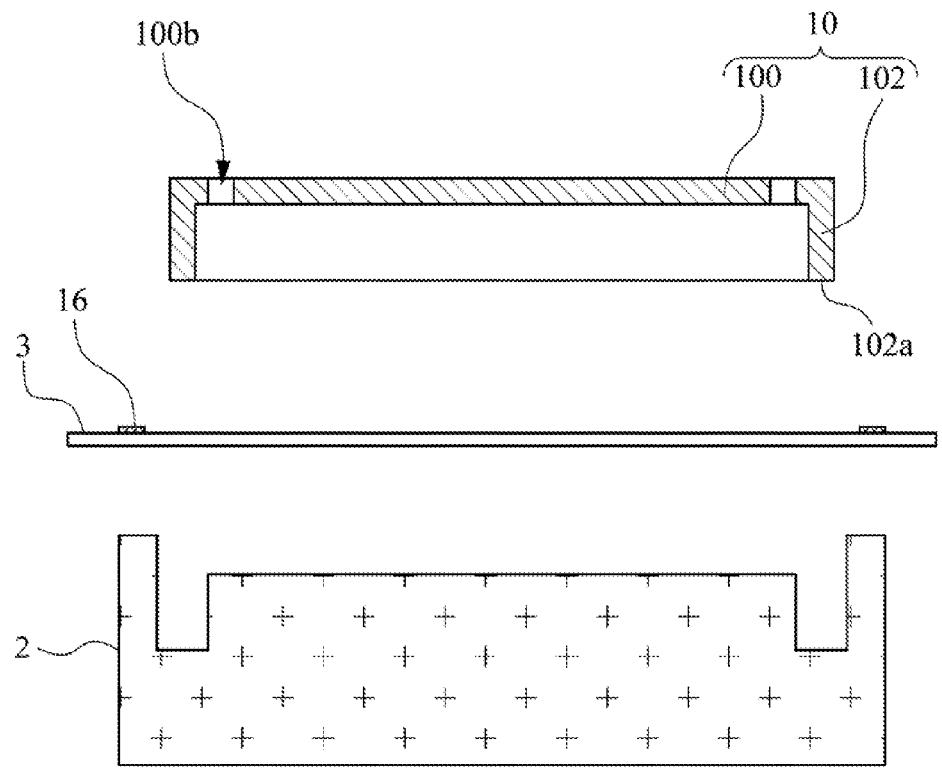
FIG. 4A is a schematic diagram of the metal member and a female die before clamping.
Figure 4B:
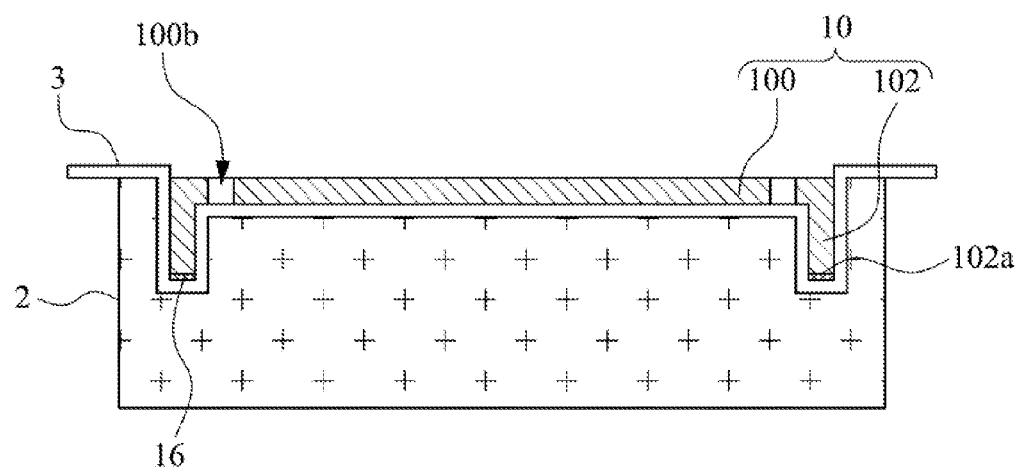
FIG. 4B is a schematic diagram of the metal member and the female die after clamping.
Figure 5A:
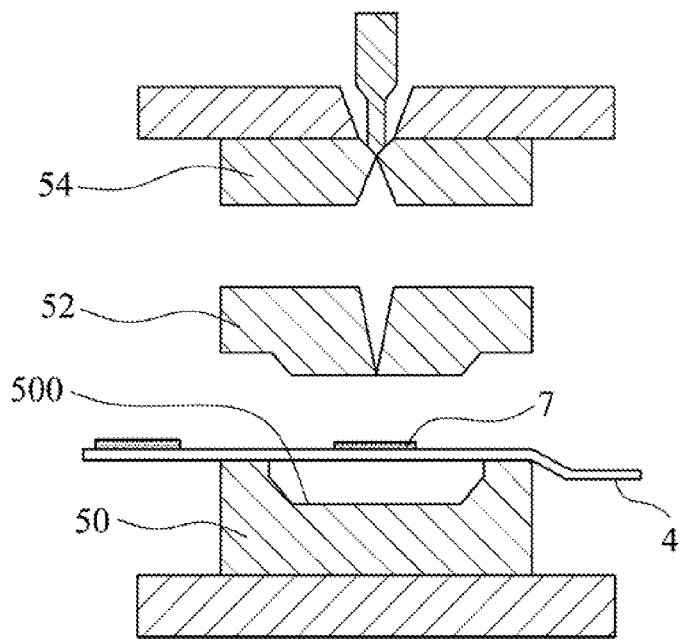
FIGS. 5A-5D are schematic diagrams of the conventional process of In-Mold-Roller Injection Molding.
Figure 5B:
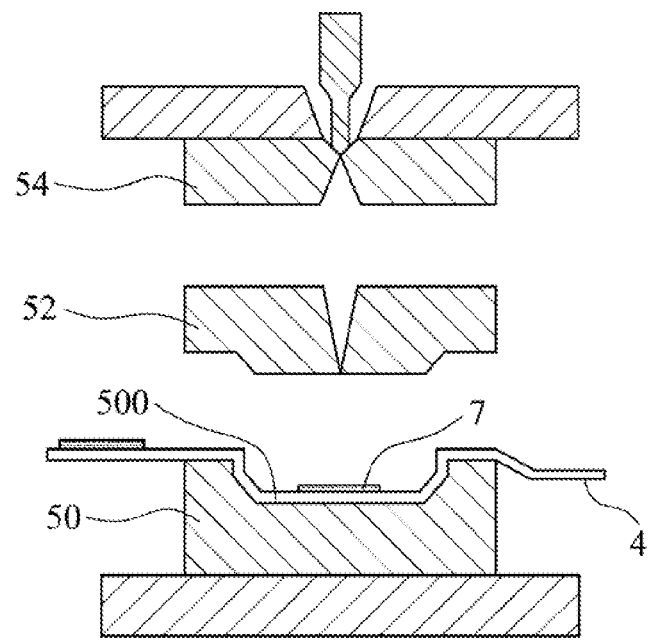
Figure 5C:
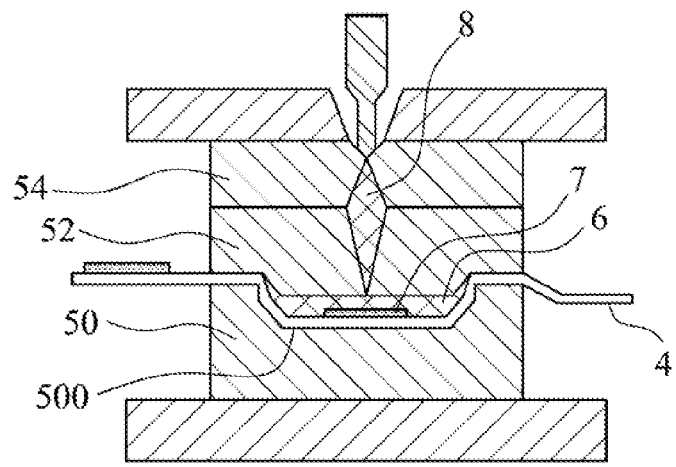
Figure 5D:
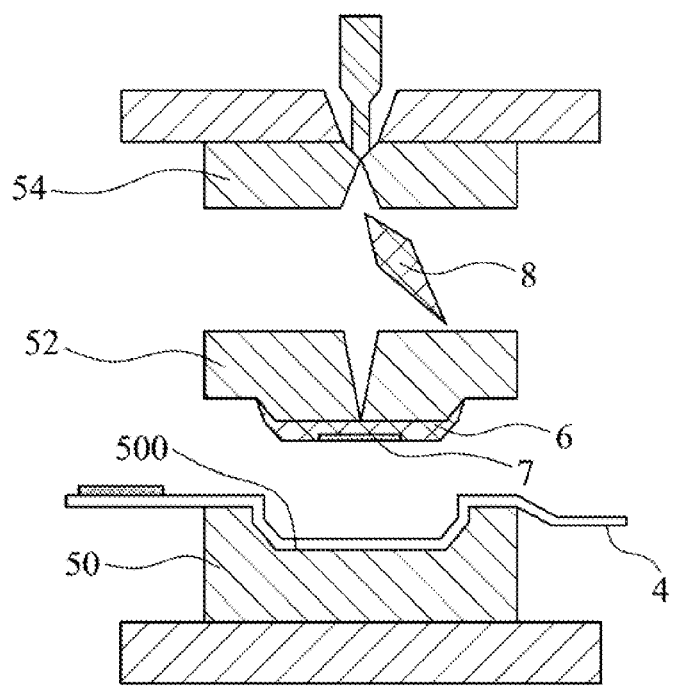

Referring to FIG. 1, FIG. 2A, FIG. 2B, FIG. 2C, FIG. 2D, FIG. 3A, and FIG. 3B. FIG. 1 is a flow diagram of a method of fabricating a housing according to an embodiment of the disclosure. FIG. 2A is a cross-sectional view of a metal member 10 and a filler 12 according to an embodiment of the disclosure, in which the filler 12 is not fixed onto the metal member 10 yet. FIG. 2B is a cross-sectional view of the next step of FIG. 2A, in which the filler 12 has been fixed onto the metal member 10. FIG. 2C is a cross-sectional view of the next step of FIG. 2B, in which a plastic 14 and an ink layer 16 are formed on the metal member 10 and the filler 12. FIG. 2D is a cross-sectional view of the next step of FIG. 2C, in which a part of the filler 12 and a part of the plastic 14 have been removed. FIG. 3A is a perspective view corresponding to FIG. 2A. FIG. 3B is a perspective view corresponding to FIG. 2B. FIG. 4A is a schematic diagram of the metal member 10 and a female die 2 before clamping. FIG. 4B is a schematic diagram of the metal member 10 and the female die 2 after clamping.

As shown in FIG. 1 and FIG. 2A, at first, step S100 is providing the metal member 10, in which the metal member 10 includes a base plate 100 and a sidewall 102, the base plate 100 has an inner surface 100a, the sidewall 102 is connected to the inner surface 100a and disposed at an edge of the inner surface 100a. Because the sidewall 102 is substantially perpendicular to the inner surface 100a, the junction of the sidewall 102 and the inner surface 100a is uneven and has a large curvature. Referring to FIG. 4A and FIG. 4B, if a process of In-Mold-Roller Injection Molding is directly performed to the metal member 10, a portion of the female die 2 corresponding to the junction of the base plate 100 and the sidewall 102 also has a large curvature, so that during transferring, a film 3 may be broken or folded while being adsorbed to the female die 2.

As shown in FIG. 1 and FIG. 2B, in the embodiment, step S102 is providing the filler 12, in which the filler 12 has a connecting surface 120a and a first top surface 120b, and step S104 is fixing the filler 12 onto the metal member 10, so as to make the connecting surface 120a connect to the inner surface 100a to form a first included angle θ1, and make the connecting surface 120a connect to the first top surface 120b to form a second included angle θ2, in which the first included angle θ1 and the second included angle θ2 are larger than 90 degrees and smaller than 180 degrees. After the filler 12 is fixed onto the inner surface 100a of the base plate 100, the connecting surface 120a is smoothly connected to the inner surface 100a, so as to make the curvature of the junction of the connecting surface 120a and the inner surface 100a be smaller. In addition, the sidewall 102 has a second top surface 102a, and when the filler 12 is fixed onto the inner surface 100a of the metal member 10, the first top surface 120b and the second top surface 120a are located on the same horizontal plane.

In other words, the junction having a large curvature of the base plate 100 and the sidewall 102 will disappear because of the filler 12, so as to make the assembled metal member 10 and filler 12 form a smooth appearance surface. Therefore, if the process of In-Mold-Roller Injection Molding is performed to the assembled metal member 10 and the filler 12, the film 3 corresponding to the smooth appearance surface and the junction on the female die 2 will not be folded or broken while being adsorbed to the female die 2.

In an embodiment, the first included angle θ1 between the connecting surface 120a and the inner surface 100a is an obtuse angle (e.g., 90°<θ1<180°). The second included angle θ2 between the connecting surface 120a and the first top surface 120b is an obtuse angle (e.g., 90°<θ2<180°). However, the disclosure is not limited in this regard. Preferably, the first included angle θ1 and the second included angle θ2 are larger than or equal to 120 degrees, and smaller than or equal to 150 degrees. In more detail, an arc-shaped radius corner 120a1 is formed at the junction of the connecting surface 120a and the inner surface 100a, and another arc-shaped radius corner 120a2 is formed at the junction of the connecting surface 120a and the first top surface 120b, so as to reduce the situation that the film 3 is broken or folded while being adsorbed. Therefore, the connecting surface 120a and the inner surface 100a (or the first top surface 120b) can be smoothly connected to each other.

As shown in FIG. 3A and FIG. 3B, in more detail, in the embodiment, the sidewall 102 and the filler 12 are ring-shaped. The filler 12 is fixed onto the inner surface 100a to make the sidewall 102 surround a side of the filler 12 that is away from the inner surface 100a, in which the connecting surface 120a is located at a side of the filler 12 that is close to the inner surface 100a. In an embodiment, with reference to FIG. 2A and FIG. 2B, the metal member 10 has a first engaging structure 100b. The first engaging structure 100b is disposed at the base plate 100. The filler 12 further has a second engaging structure 122. The way of fixing the filler 12 onto the metal member 10 in the step S104 is engaging the second engaging structure 122 to the first engaging structure 100b. In detail, the first engaging structure 100b is an engaging hole formed on the base plate 100, and the second engaging structure is a hook, but the disclosure is not limited in this regard.

As shown in FIG. 1 and FIGS. 2C-2D, in the embodiment, the method of fabricating a housing further includes steps S106-S108 shown below.

Step S106: providing the film 3 on which the ink layer 16 is attached, and then performing a process of In-Mold-Roller Injection Molding, so as to form the plastic 14 on the sidewall 102 and the filler 12 and make the plastic 14 form a side inclined surface 140a and an upper appearance surface 140b, and the film 3 and the plastic 14 are pressed to make the ink layer 16 attach to the upper appearance surface 140b of the plastic 14, so as to form a surface of a part of the plastic 14 to become the upper appearance surface 140b having the ink layer 16. The ink layer 16 forms a decorative layer including ink paint. When forming the plastic 14 on the sidewall 102 and the filler 12 in the process of In-Mold-Roller Injection Molding in the step S106, the ink layer 16 is attached to the plastic 14 at the same time. In detail, as shown in FIG. 2B and FIG. 2C, when the filler 12 is fixed onto the inner surface 100a, a gap G is formed between the filler 12 and the sidewall 102, and the gap G is filled with the plastic 14.

Step S108: machining the metal member 10, the filler 12, and the plastic 14 after performed by the process of In-Mold-Roller Injection Molding, removing at least a part of the filler 12 and at least a part of the plastic 14 to form a machined surface 200, in which the machined surface 200 is connected to the inner surface 100a to form a first machined angle θ3, and the junction where the machined surface 200 is connected to the upper appearance surface 140b forms a second machined angle θ4. In detail, as shown in FIG. 2D, the machined housing 1 includes the metal member 10, a part of the filler 12, and a part of the plastic 14, the machined surface 200 is substantially perpendicular to the inner surface 100a, and the machined surface 200 is substantially perpendicular to the upper appearance surface 140b. That is, the first machined angle θ3 between the machined surface 200 and the inner surface 100a, and the second machined angle 84 are 90 degrees. However, the disclosure is not limited in this regard, and the first machined angle 83 and the second machined angle θ4 can also be larger than 90 degrees.

In addition, the foregoing step S108 can be achieved by using CNC machine tools to machine the side inclined surface 140a of the plastic 14, but the disclosure is not limited in this regard. After machined, the machined surface 200 formed is substantially perpendicular to the inner surface 100a. In which the metal member 10, the machined filler 12 and the machined plastic 14 constitute a recess-shaped frame, the frame and the decorative layer (i.e., the ink layer 16) constitute the housing 1. Therefore, the method of fabricating a housing of the embodiment can really be implemented to manufacture the housing 1 having the appearance surface with large curvature by applying the process of In-Mold-Roller Injection Molding.

Figure 2E:
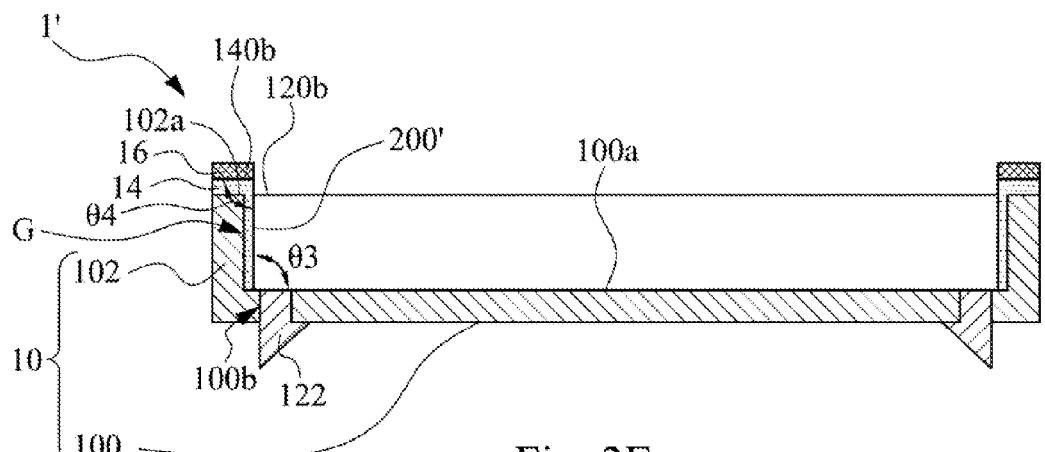
FIG. 2E is a cross-sectional view of FIG. 2C according to another embodiment, in which the filler and a part of the plastic over an inner surface have been removed.

Referring to FIG. 2E. FIG. 2E is a cross-sectional view of FIG. 2C according to another embodiment, in which the filler 12 and a part of the plastic 14 over the inner surface 100a have been removed. In detail, the machined housing 1' includes the metal member 10, a part of the plastic 14 and the residual second engaging structure 122 of the filler 12 that is engaged with the metal member 10, a part of the plastic 14 form a machined surface 200', and the machined surface 200' is substantially perpendicular to the inner surface 100a. Therefore, the method of fabricating a housing of the embodiment can also really be implemented to manufacture the housing 1' having the appearance surface with large curvature by applying the process of In-Mold-Roller Injection Molding.

Figure 2F:
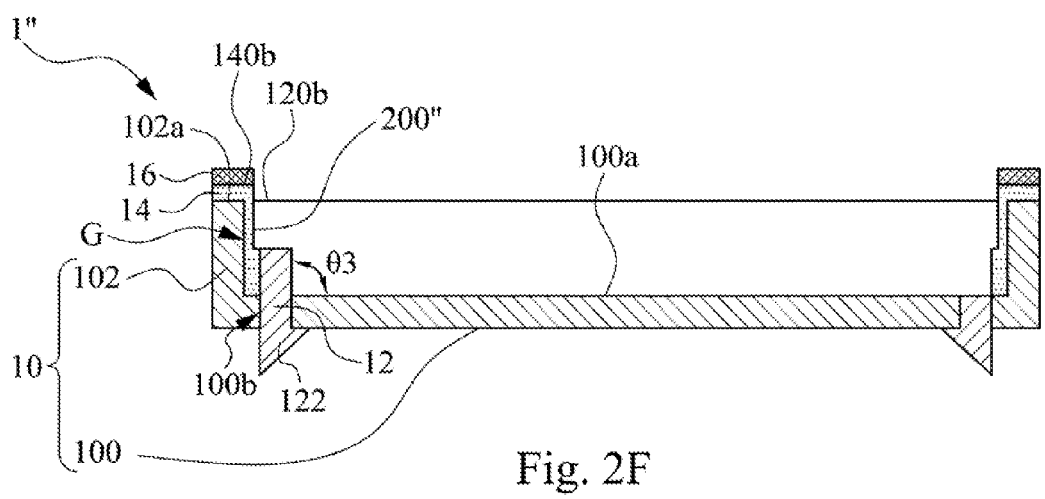
FIG. 2F is a cross-sectional view of FIG. 2C according to another embodiment, in which a part of the filler and a part of the plastic over the inner surface have been removed.

Referring to FIG. 2F. FIG. 2F is a cross-sectional view of FIG. 2C according to another embodiment, in which a part of the filler 12 and a part of the plastic 14 over the inner surface 100a have been removed. In detail, the machined housing 1" includes the metal member 10, a part of the filler 12 and a part of the plastic 14, the residual filler 12 and plastic 14 form a machined surface 200", the machined surface 200" has a step to form a stepped structure, and the machined surface 200" is substantially perpendicular to the inner surface 100a. The step of the machined surface 200" can be used as an internal structure in the housing 1", so as to be incorporated with other electronic components (e.g., a display module, a circuit board, a battery, etc.) disposed in the housing 1" in subsequent assembly processes. Therefore, the method of fabricating a housing of the embodiment can also really implement to manufacture the housing 1" having the appearance surface with large curvature by applying the process of In-Mold-Roller Injection Molding.

In these embodiments, the machined surfaces 200, 200', 200" are located on a part of the plastic 14 and/or a part of the filler 12, but the disclosure is not limited in this regard. In other embodiments, based on actual needs, the machined surfaces 200, 200', 200" can be located on the filler 12 at the same time or on the plastic 14 at the same time.

In practical applications, the housing 1, 1', 1" respectively shown in FIG. 2D, FIG. 2E, and FIG. 2F can be selectively manufactured according to actual needs (e.g., the side of the sidewall 102 close to the inner surface 100a needs to reserve a thickness). In the disclosure, the housing 1, 1', 1" are housings of cell phones on which display modules are disposed, but the disclosure is not limited in this regard. The engaging structure shown in the foregoing figures has been closely connected to the plastic 14 and the metal member 10 after the process of In-Mold-Roller Injection Molding, and the plastic 14 can also be formed on the back (not shown) of the metal member 10 in practical manufacturing processes, so the engaging structure of the filler 12 will be closely connected to the plastic 14, but the disclosure is not limited in this regard.

According to the foregoing recitations of the embodiments of the disclosure, it can be seen that the method of fabricating a housing of the present disclosure is firstly fixing the filler onto the metal member, so as to make the appearance surface which is uneven or has a larger curvature on the metal member disappear because the filler closes up to the metal member, and a flat appearance surface is formed at the junction of the assembled filler and the metal member. Therefore, when the process of In-Mold-Roller Injection Molding is performed to the metal member and the filler, the film used for transferring can be successfully attached onto the assembled metal member and the filler without being folded or broken. After injecting, the metal member and the filler will be combined with the injected plastic and attached with the transferred ink layer. Finally, by further machining to remove at least a part of the filler and a part of the plastic, the housing having the appearance surface which is uneven or has a larger curvature manufactured by applying the process of In-Mold-Roller Injection Molding can be implemented.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A housing applicable for an electronic device, the housing comprising:

a frame comprising a bottom surface, a machined surface, and an upper appearance surface, the machined surface connecting to the bottom surface to form a first machined angle at the junction of the machined surface and the bottom surface, the upper appearance surface being connected to the machined surface to form a second machined angle at the junction of the upper appearance surface and the machined surface, wherein the frame further comprises a metal member, a filler and a plastic, the metal member comprises a base plate and at least a sidewall, the base plate has an inner surface, the bottom surface is a part of the inner surface, the sidewall is connected to the inner surface and disposed at an edge of the inner surface, the filler is fixed onto the metal member, the plastic is formed on the metal member, at least one of a portion of the filler and a portion of the plastic forms the machined surface, and another portion of the plastic forms the upper appearance surface.

2. The housing of claim 1, wherein the first machined angle and the second machined angle are larger than or equal to 90 degrees.

3. The housing of claim 1, wherein the frame has a recess formed thereon.

4. The housing of claim 1, wherein the machined surface is formed at the plastic or the filler, the plastic or the filler covers a portion of the inner surface, and a remaining portion of the inner surface is the bottom surface.

5. The housing of claim 1, wherein a gap is formed between the filler and the sidewall, and the gap is filled with the plastic.

6. The housing of claim 1, wherein the machined surface is formed at the plastic and the filler, the plastic and the filler cover a portion of the inner surface, and a remaining portion of the inner surface is the bottom surface.

7. The housing of claim 1, wherein the filler is disposed at a side of the sidewall that is close to the inner surface.

8. The housing of claim 1, wherein the base plate has a first engaging structure, the filler comprises a second engaging structure, and the first engaging structure and the second engaging structure are engaged with each other.

9. The housing of claim 1, wherein the machined surface has a step to form a stepped structure.

10. The housing of claim 1, wherein an ink layer on the upper appearance surface comprises ink paint.

* * * * *